United States Patent [19]

Instance

[11] Patent Number: 4,894,106

[45] Date of Patent: Jan. 16, 1990

[54] METHOD FOR MANUFACTURE OF LABELS

[76] Inventor: David J. Instance, Guinea Hall, Sellindge, Kent, United Kingdom

[21] Appl. No.: 2,810

[22] Filed: Jan. 13, 1987

[30] Foreign Application Priority Data

Jan. 24, 1986 [GB] United Kingdom ................ 8601695

[51] Int. Cl.[4] ............................................ B32B 31/18

[52] U.S. Cl. ...................................... 156/227; 40/306; 156/267; 156/269; 156/270; 156/277; 156/301; 156/302; 156/516; 156/522; 283/81; 283/106; 428/40

[58] Field of Search ............... 156/250, 268, 269, 522, 156/552, 516, 267, 510, 277, 227, 299-303, 270; 283/81, 106; 428/40-42, 121; 40/306, 310, 312

[56] References Cited

U.S. PATENT DOCUMENTS

| | | | |
|---|---|---|---|
| 1,896,834 | 2/1933 | Brown | 283/81 X |
| 1,911,291 | 5/1933 | Reynolds | 156/269 X |
| 1,924,909 | 8/1933 | Brown | 283/81 |
| 2,127,081 | 8/1938 | Brown | 40/306 |
| 2,706,865 | 4/1955 | Miller | 40/306 |
| 3,068,140 | 12/1962 | Biddle | 156/250 X |
| 3,424,636 | 1/1969 | Brody | 156/269 X |
| 3,966,534 | 6/1976 | Oddy | 156/384 |
| 4,081,309 | 3/1978 | Jenkins | 156/250 |
| 4,153,496 | 5/1979 | Swift | 156/269 X |
| 4,323,608 | 4/1982 | Denny et al. | 40/306 X |
| 4,529,229 | 7/1985 | Glibbery | 428/40 X |
| 4,534,582 | 8/1985 | Howard | 40/306 X |
| 4,592,572 | 6/1986 | Instance | 428/40 X |
| 4,688,826 | 8/1987 | Hosoya | 40/312 X |
| 4,744,591 | 5/1988 | Instance | 283/81 X |

FOREIGN PATENT DOCUMENTS

| | | |
|---|---|---|
| 2219845 | 9/1974 | France . |
| 2171386 | 8/1986 | United Kingdom . |

*Primary Examiner*—Michael W. Ball
*Assistant Examiner*—Jeff H. Aftergut
*Attorney, Agent, or Firm*—Limbach, Limbach & Sutton

[57] ABSTRACT

A method of producing labels, the method comprising the steps of:

(a) providing an elongate support web;

(b) disposing a succession of sheets in a row along the length of the support web;

(c) covering the assembly of the succession of sheets on the support web with a web of a self-adhesive laminar material which is adhered by the self-adhesive surface thereof over the said assembly;

(d) cutting through the laminar material and through the support web so as to form a succession of multiple labels each of which has a respective one of the sheets adhered to the support web by the laminar material; and (e) cutting, either before, after or simultaneously with cutting step (d), at least one cut through the laminar material, through the respective sheet and through the support web of each of the multiple labels so as to divide each multiple label into at least two labels, each of which has a respective portion of the respective sheet which is adhered to a respective portion of the support web by a respective portion of the laminar material. The invention also provides a label made by that method.

7 Claims, 1 Drawing Sheet

METHOD FOR MANUFACTURE OF LABELS

BACKGROUND TO THE INVENTION

The present invention relates to a method of producing labels and to labels. In particular, the present invention relates to a method of producing self-adhesive labels having a folded sheet covered by an overlaid self-adhesive laminar material.

It is frequently desirable to attach multi-layer self-adhesive labels to products, the labels carrying, for example instructions and/or a guarantee form. In many applications it is necessary to protect the label from soiling or damage by tearing. The present invention aims to provide such a label. In addition, there is a need for a method of making inexpensively and reliably such self-adhesive labels which are carried in succession on a release backing material. The resultant labels must be made to close tolerances so that they can be applied to the product to be labelled by high speed automatic labelling machines. The present invention also aims to provide such a method of producing labels.

SUMMARY OF THE INVENTION

Accordingly, the present invention provides a method of producing labels, the method comprising the steps of:

(a) providing an elongate support web;

(b) disposing a succession of sheets in a row along the length of the support web;

(c) covering the assembly of the succession of sheets on the support web with a web of a self-adhesive laminar material which is adhered by the self-adhesive surface thereof over the said assembly;

(d) cutting through the laminar material and through the support web so as to form a succession of multiple labels each of which has a respective one of the sheets adhered to the support web by the laminar material; and (e) cutting, either before, after or simultaneously with cutting step (d), at least one cut through the laminar material, through the respective sheet and through the support web of each of the multiple labels so as to divide each multiple label into at least two labels, each of which has a respective portion of the respective sheet which is adhered to a respective portion of the support web by a respective portion of the laminar material.

Preferably, the support web is self-adhesive and is carried on a length of a release backing material and in cutting steps (d) and (e) the support web is cut through as far as the release backing material.

The present invention further provides a label comprising a support web, a sheet which is disposed over the front face of the support web and a self-adhesive laminar material which is adhered by the self-adhesive surface thereof over the front face of the sheet and at least to two portions of the front face of the support web which are on opposing sides of the sheet thereby to cover the sheet and adhere the sheet to the support web, at least one edge of the label which extends between the said two portions having coincident edges of the sheet, the laminar material and the support web.

Preferably, the support web is self-adhesive on the rear face thereof whereby the label is self-adhesive.

BRIEF DESCRIPTION OF THE DRAWINGS

An embodiment of the present invention will now be described by way of example with reference to the accompanying drawings, in which.

DESCRIPTION OF THE PREFERRED EMBODIMENTS

Figure 1:
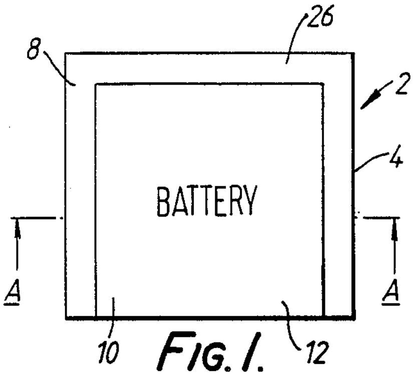
FIG. 1 is a plan view of a label made in accordance with the present invention.
Figure 2:
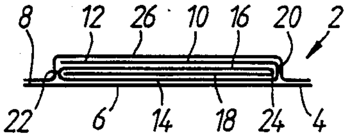
FIG. 2 is a section on line A—A of the label of FIG. 1.

Referring to FIGS. 1 and 2, a label 2 comprises a support web 4 having a rear face 6 which is self-adhesive. Disposed over the front face 8 of the support web 4 is a folded sheet 10 which is a longitudinal strip e.g. of paper which has been divided into a row of panels 12, 14, 16, 18 by a series of transverse fold lines 20, 22, 24. One edge of the folded sheet 10 coincides with an edge of the support web 4. A layer of a self-adhesive laminar material 26, such as a self-adhesive clear polyester sheet, is adhered by the self-adhesive surface thereof to the front panel 12 of the folded sheet 10 and the self-adhesive laminar material 26 extends over three of the four edges of the folded sheet 10 and is adhered directly to the support web 4 around those three edges. The self-adhesive laminar material 26 is co-extensive with the support web 4. In this why the folded sheet 10 is adhered in a folded condition to the support web 4. The fourth edge of the folded sheet 10 coincides with a part of an edge of the support web 4 and also with a part of an edge of the self-adhesive laminar material 26.

In use the self-adhesive rear face 6 of the support web 4 is adhered to a product such as, for example, a car battery. The fourth edge of the folded sheet 10 which is not covered by the self-adhesive laminar material 26 is directed downwardly so that any. liquid, such as battery acid, which flows down the battery and over the label does not contact the folded sheet 10 but rather flows over the self-adhesive laminar material 26. This helps to protect the folded sheet 10 from soiling. The laminar material 26 also helps to protect the folded sheet 10 from being torn accidentally.

Figure 3:
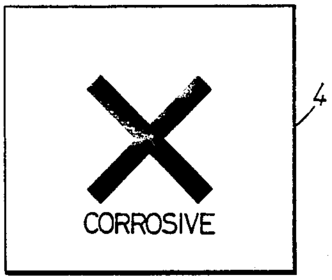
FIG. 3 is a plan view of a support web which forms part of the label of FIG. 1.
Figure 4:
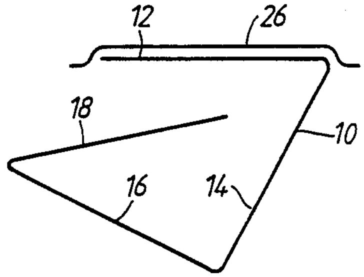
FIG. 4 is a section of an assembly of a folded sheet and a self-adhesive laminar material which has been separated from the support web shown in FIG. 3.

The folded sheet 10 is printed with information relating to the product e.g. instructions for use and/or details of a gurantee on the product. When it is desired to read that information, a user merely grips the free bottom edge of the folded sheet 10 and pulls it upwardly, thereby separating the assembly of the folded sheet 10 and the self-adhesive laminar material 26 from the support web 4 by pulling away from the support web 4 those portions of the laminar material 26 which are adhered thereto. FIG. 3 shows the support web 4 after the folded sheet 10/laminar material 26 assembly which is shown in FIG. 4, has been removed therefrom.

Figure 5:
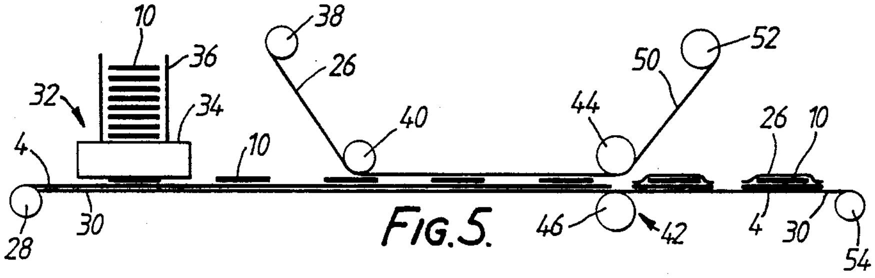
FIG. 5 is a schematic diagram showing an apparatus for making labels in accordance with the present invention.

The front face 8 of the support web 4 is printed, as shown, with information relating to the product which is designed to remain on the product throughout its useful life. For example, the front face 8 may have information concerning the properties of the product e.g. the corrosivity of car battery acid. When the folded sheet 10 has been removed from the support web 4 as described, it can be unfolded and the panels 14, 16, 18 which were previously concealed by the front panel 12 can be read by a user. FIG. 5 shows schematically an apparatus for producing labels in accordance with the present invention.

A reel 28 of an elongate web of the self-adhesive support web 4 carried on a release backing material 30 is mounted and unwound along a pathway to a folded sheet applying station 32 at which a folded sheet applicator 34, which incorporates a magazine 36 for holding a stack of folded sheets 10, is arranged successively to position folded sheets 10 in a row along the elongate support web 4, each folded sheet 10 being spaced from the adjacent two folded sheets 10 and extending laterally across the support web 4. The upper surface 8 of the support web 4 has a succession of printed images thereon and the folded sheets 10 are applied so that each folded sheet 10 is in registry with and covers a respective printed image on the upper surface 8 of the support web 4. The folded sheet applicator 34 may be of the type which is disclosed in British Patent Specification No. 2122966 entitled "Method and Apparatus for Producing Labels" or in British Patent Specification No. 2127378 entitled "Method of Producing Labels". A suitable folded sheet applicator 34 includes rotary indexable arms carrying vaccum-actuated suction pads for holding and releasing the sheets to be transferred from the stack thereof to the support web 4.

In order to maintain the folded sheets 10 accurately in position on the support web 4 before they are adhered thereto by the self-adhered laminar material 26, the folded sheets may be provided on their bottom face with an adhesive e.g. a pressure sensitive adhesive which ensures that when the folded sheets are pressed by the folded sheets applicator 34 against the support web 4 they are adhered thereto. Alternatively, there could be provided upstream of the folded sheet applying station 32 an adhesive applying station such as that described in the two British Patent Specifications referred to above, which incorporates an adhesive applicator which is arranged to deposit small amounts of adhesive onto the support web at the required locations in registry with the printed images on the support web 4 so that the folded sheets 10 are removably adhered in position on the support web 4. For example, the adhesive applicator may be arranged to deposit four spots of adhesive around each printed image so that each folded sheet is adhered at its four corners to the support web by the adhesive.

The elongate support web 4 then passes to a self-adhesive laminar material applying station at which the self-adhesive surface of a web of self-adhesive laminar material 26, which is fed out from a reel 38 thereof, is pressed by an application roller 40 against the assembly of the elongate support web 4 and the row of folded sheets 10. The width of the laminar material 26 is the same as that of the support web 4 and the laminar material covers all of the support web 4 and the folded sheets 10. The laminar material 26 thus surrounds each of the folded sheets 10 and adheres them firmly to the support web.

The composite web is then fed to a die-cutting roller 42 consisting of an upper, die-cutting, roller 44 and a lower,-backing, roller 46. The die-cutting roller 44 is adapted to cut through all of the layers of the composite web as far as, but not through the release backing material 30. The die-cutting roller 46 cuts around each folded sheet 10 so as to form a succession of multiple labels each of which include a respective folded sheet 10 which is adhered to a respective support web portion by a respective portion of the laminar material. In each multiple label the respective folded sheet 10 is surrounded by a region in which the laminar material 26 is adhered to the support web 4. The die-cutting roller 46 also cuts a longitudinal cut 48 through each laminar material 26/folded sheet 10/support web portion 4 so that each multiple label is cut into two separate labels 2, with each folded sheet 10 being divided into two parts, each of which parts is comprised within a respective resultant label 2. The waste web remnant 50 of the support web 4 and the laminar material 26 which lies outside the multiple lables is removed onto a take-up roll 52. The release backing material 30 carrying thereon the succession of pairs of labels 2 is wound up onto a supply roll 54.

Figure 6:
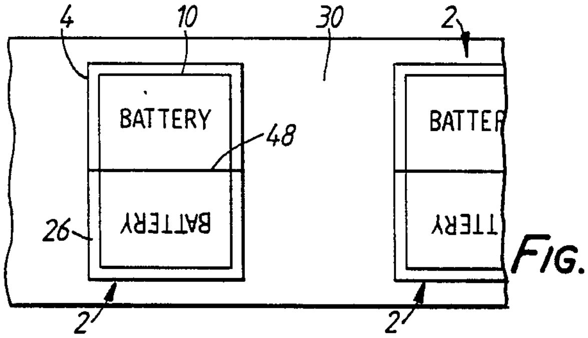
FIG. 6 is a plan view of a length of release backing material carrying thereon self-adhesive labels made by the apparatus shown in FIG. 5.

FIG. 6 shows the pairs of labels 2 of the invention on the release backing material 30 in the form that they are wound up into the supply roll 54.

If desired, in an alternative arrangement, the die-cutting roller 46 could be adapted to cut a continuous central longitudinal cut through the release backing material 30 along its length when cutting the longitudinal cuts 48 so that two individual lengths of release backing material 30, each carrying a respective succession of labels 2 thereon, are wound up onto respective supply rolls 54. Thus in the illustrated arrangement the cuts 48 would extend as a continuous cut and through the release backing material 30 as well as through the various layers of each multiple label.

Furthermore, in the illustrated arrangement each folded sheet 10 consists of two opposing upper and lower portions each of which is to be incorporated in a respective label 2. If desired, the folded sheet 10 could consist of three or more such portions and the die-cutting roller 46 could be adapted to cut a corresponding number of labels 2 from each folded sheet 10. Of course, any folded sheet portion other than the two end folded sheet portions from each folded sheet 10 would be adhered to the support web 4 only at its leading and trailing lateral edges and not at its top longitudinal edge.

Additionally, while in the illustrated arrangement a single die-cutting roller 46 is used to form the multiple labels and to cut the succession of cuts 48, it will be understood that two separate die-cutting rollers could be used, in any desired order, so as to cut separately (a) around the folded sheets 10 so as to form the multiple labels and (b) through the folded sheets 10 so as to divide each multiple label into two labels.

In an alternative arrangement, the support web 4 is not self-adhesive but is rather an elongate web of a stiff paper. During die-cutting, the support web is cut right through so as to form a plurality of individual loose labels which can subsequently be applied to articles to be labelled or can be packed loose within packaging for the articles.

What I claim is:

1. A method of producing labels, the method comprising the steps of:

(a) providing an elongate support web;

(b) disposing a succession of individual discrete folded printed sheets in a row along the length of the support web;

(c) covering the succession of sheets on the support web with a web of a self-adhesive laminar material which is adhered by the self-adhesive surface thereof over the succession of sheets and the support web;

(d) cutting through the laminar material and through the support web so as to form a succession of multiple labels each of which has a respective one of the sheets adhered to the support web by the laminar material; and (e) cutting, either before, after or simultaneously with cutting step (d), at least one cut through the laminar material, through the respective sheet and through the support web of each of the multiple labels so as to divide each multiple label into at least two labels, each of which has a respective portion of the respective sheet which is adhered to a respective portion of the support web by a respective portion of the laminar material.

2. A method according to claim 1, wherein the support web is self-adhesive and is carried on a length of release backing material and in cutting steps (d) and (e) the support web is cut through as far as the release backing material.

3. A method according to claim 1, wherein in each label each of the said portions of the respective sheet is surrounded by a region in which the laminar material is adhered to the support web except at that edge thereof which was formed in cutting step (e).

4. A method according to claim 1, wherein the laminar material is a self-adhesive polyester sheet.

5. A method according to claim 1, wherein in disposing step (b) the sheets are disposed laterally across the support web and in cutting step (e) the said at least one cut extends longitudinally along the support web.

6. A method according to claim 2, wherein in disposing step (b) the sheets are disposed laterally across the support web and in cutting step (e) the said at least one cut extends longitudinally along the support web, is a continuous longitudinally extending cut and also cuts through the release backing material.

7. A method according to claim 1, wherein each sheet is a folded longitudinal strip which is divided into a row of panels by a plurality of transverse fold lines.

* * * * *